US012654690B2

(12) United States Patent (10) Patent No.: US 12,654,690 B2

Fearon et al. (45) Date of Patent: Jun. 16, 2026

(54) INTRUSION-BASED COLLISION AVOIDANCE

(71) Applicant: Toyota Jidosha Kabushiki Kaisha, Aichi-ken (JP)

(72) Inventors: Francis E. Fearon, Palo Alto, CA (US); Matthew J. Brown, Palo Alto, CA (US); Julia Pralle, Palo Alto, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/427,069

(22) Filed: Jan. 30, 2024

(65) Prior Publication Data

US 2025/0242799 A1    Jul. 31, 2025

(51) Int. Cl.
B60W 30/09 (2012.01)
B60W 10/18 (2012.01)
(Continued)

(52) U.S. Cl.
CPC ............ B60W 30/09 (2013.01); B60W 10/18 (2013.01); B60W 30/0956 (2013.01); (Continued)

(58) Field of Classification Search
CPC .. B60W 30/09; B60W 10/18; B60W 30/0956; B60W 30/18154; B60W 50/14; (Continued)

(56) References Cited

U.S. PATENT DOCUMENTS

2012/0320080 A1* 12/2012 Giese ...................... G06F 3/011
345/619
2015/0109118 A1* 4/2015 Urano ................... B60W 30/09
340/435
(Continued)

FOREIGN PATENT DOCUMENTS

CN 106030609 A * 10/2016 ............. H04N 23/90
CN 106908783 A * 6/2017 ............. G06F 18/25
(Continued)

OTHER PUBLICATIONS

Road context-aware intrusion detection system for autonomous cars (https://asset-group.github.io/papers/ICICS19-RAIDS.pdf), Dec. 20, 2023.

*Primary Examiner* — Babar Sarwar
(74) *Attorney, Agent, or Firm* — DINSMORE & SHOHL LLP

(57) ABSTRACT

Certain aspects of the disclosure pertain intrusion-based collision avoidance. A bounding box can be generated to capture the size and position of an object in a traffic lane comprising a left lane line and a right lane line. A metric is computed based on one or more vertices of the bounding box that capture the extent to which the object intrudes on the lane. The vertices can be projected to the lane lines, and a distance computed between a vertex and a projection. Ratios can be determined for vertices based on distances that capture the positioning relative to lane width. The ratios can be analyzed and utilized as a basis for the metric. The metric can then be compared with at least one threshold. A collision avoidance response can be triggered if the metric satisfies the threshold.

18 Claims, 9 Drawing Sheets

(51) Int. Cl.
  *B60W 30/095* (2012.01)
  *B60W 30/18* (2012.01)
  *B60W 50/14* (2020.01)
  *G06V 10/25* (2022.01)
  *G06V 20/58* (2022.01)

(52) U.S. Cl.
  CPC ...... *B60W 30/18154* (2013.01); *B60W 50/14* (2013.01); *G06V 10/25* (2022.01); *G06V 20/58* (2022.01); *B60W 2050/143* (2013.01); *B60W 2050/146* (2013.01); *B60W 2420/403* (2013.01); *B60W 2554/4041* (2020.02)

(58) Field of Classification Search
  CPC ..... B60W 2050/143; B60W 2050/146; B60W 2420/403; B60W 2554/4041; G06V 10/25; G06V 20/58
  See application file for complete search history.

(56) References Cited

U.S. PATENT DOCUMENTS

| | | | | |
|---|---|---|---|---|
| 2017/0029026 | A1* | 2/2017 | Okuda | B62D 15/025 |
| 2019/0061743 | A1* | 2/2019 | Ozawa | B60W 30/09 |
| 2019/0064829 | A1* | 2/2019 | Ozawa | B60Q 9/008 |
| 2019/0257951 | A1* | 8/2019 | Melgangolli | G01S 17/931 |
| 2021/0107528 | A1* | 4/2021 | Fujita | G06V 20/58 |
| 2022/0281443 | A1* | 9/2022 | Sung | B60W 40/08 |
| 2023/0014874 | A1* | 1/2023 | Shen | G06V 10/82 |
| 2023/0192141 | A1* | 6/2023 | Zhang | G06V 10/25 |
| 2023/0294676 | A1* | 9/2023 | Oka | B60W 30/08 |
| | | | | 701/26 |
| 2024/0123983 | A1* | 4/2024 | Morimoto | B60W 30/09 |
| 2024/0208538 | A1* | 6/2024 | Hotta | B60W 30/09 |

FOREIGN PATENT DOCUMENTS

| | | | | | |
|---|---|---|---|---|---|
| CN | 108444390 | A | * | 8/2018 | G01C 11/06 |
| CN | 106908783 | B | | 10/2019 | |
| CN | 111368639 | A | * | 7/2020 | G06N 3/045 |
| CN | 108444390 | B | | 1/2021 | |
| CN | 112464812 | A | * | 3/2021 | G06V 20/58 |
| CN | 111368639 | B | | 1/2022 | |
| CN | 113104050 | B | | 4/2022 | |
| CN | 112464812 | B | | 11/2023 | |
| CN | 117087664 | A | * | 11/2023 | B60W 30/0956 |
| DE | 102023132342 | A1 | * | 8/2024 | B60W 50/14 |
| JP | 5416372 | B2 | * | 2/2014 | |
| JP | 2021157449 | A | * | 10/2021 | G08G 1/096758 |

* cited by examiner

INTRUSION-BASED COLLISION AVOIDANCE

TECHNICAL FIELD

Aspects described herein relate to collision avoidance for vehicles. More specifically, aspects pertain to identifying obstacles within a traffic lane and triggering measures to avoid or mitigate collisions.

BACKGROUND

Collision avoidance systems are designed to prevent collisions between vehicles based on sensor data that monitor a vehicle's surroundings. Radar or other sensors can gather real-time data regarding the proximity of other vehicles, pedestrians, and obstacles. The gathered data can be analyzed to assess potential collision risks. If a threat is identified, a collision avoidance system can intervene in various manners, such as triggering an alert or initiating a corrective action such as applying vehicle brakes.

SUMMARY

According to one aspect, a method is disclosed comprising generating a bounding box that captures size and position of an object in a lane comprising a left lane line and right lane line, computing a metric that captures an extent to which the object intrudes on the lane based on one or more vertices of the bounding box, determining that the metric satisfies a threshold, and triggering a collision avoidance response.

In accordance with another aspect, a method is disclosed comprising generating a bounding box that captures the size and position of an object in a lane comprising a left lane line and right lane line, projecting each vertex of the bounding box to the left lane line and the right lane line, determining distance of each vertex to the left lane line and the right lane line, generating a ratio for each vertex that represents a distance relationship of the vertex relative to the left lane line and the right lane line, identifying a first ratio associated with a vertex with largest distance from the left lane line and a second ratio associated with a vertex with largest distance from the right lane line, selecting a minimum of the first ratio and the second ratio as an intrusion ratio, determining that the intrusion ratio satisfies a threshold, and triggering a collision avoidance response.

Other aspects provide systems associated with the aforementioned methods; non-transitory, computer-readable media comprising instructions that, when executed by a processor of a processing system, cause the processing system to perform the methods; and a computer program product embodied on a computer-readable storage medium comprising code for performing the aforementioned methods as well as those further described herein.

The following description and the related drawings set forth in detail certain illustrative features of one or more aspects of this disclosure.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Aspects described herein provide apparatuses, methods, processing systems, and computer-readable mediums for collision avoidance based on a measure of lane intrusion.

Conventional collision avoidance systems utilize sensors such as radar to determine the proximity of a vehicle to another vehicle, pedestrian, or obstacle. However, radar can be inaccurate in determining relative position, especially in dense and complex traffic scenarios. The inaccuracy can lead to false positives, which refer to situations where a potential collision threat is identified but does not exist. Stated differently, a collision avoidance system can generate a warning or trigger an evasive action unnecessarily. False positives can have several negative effects, including a loss of trust in system reliability, leading operators to ignore or turn off the system, driver distraction, and compromising a driver's ability to focus on the road and other important tasks. Further, if false positives occur frequently, drivers may become desensitized to warnings and not respond appropriately to a genuine warning to avoid a collision, thereby diminishing the effectiveness of the collision avoidance system.

Aspects described herein provide a technical solution to the aforementioned technical problem associated with false positives of a collision avoidance system. A collision avoidance system can determine the extent to which an object blocks a lane traveled by a vehicle. For example, an object may partially or fully block a lane. Further, a small object can block only a portion of a lane but be centrally positioned, blocking a significant portion of a lane. A metric can be computed that quantifies how much of a lane is occupied or unoccupied by an object, such as another vehicle or pedestrian. A check can be made on whether an object occupies a lane, and if so, the metric can be computed. The value of a metric can be compared to a threshold, and the collision avoidance system can be triggered to intervene with a warning, corrective action, or both when the metric satisfies the threshold. Further, the metric can be one of several factors considered by a collision avoidance system for appropriately triggering intervention.

Accordingly, aspects described herein provide many beneficial technical effects compared to conventional techniques and provide a technical solution to the aforementioned technical problem in the art.

The following now describes these systems and methods in more detail with reference to the drawings and where like numbers refer to like structures.

Example Implementation of Intrusion-Based Collision Avoidance

Figure 1:
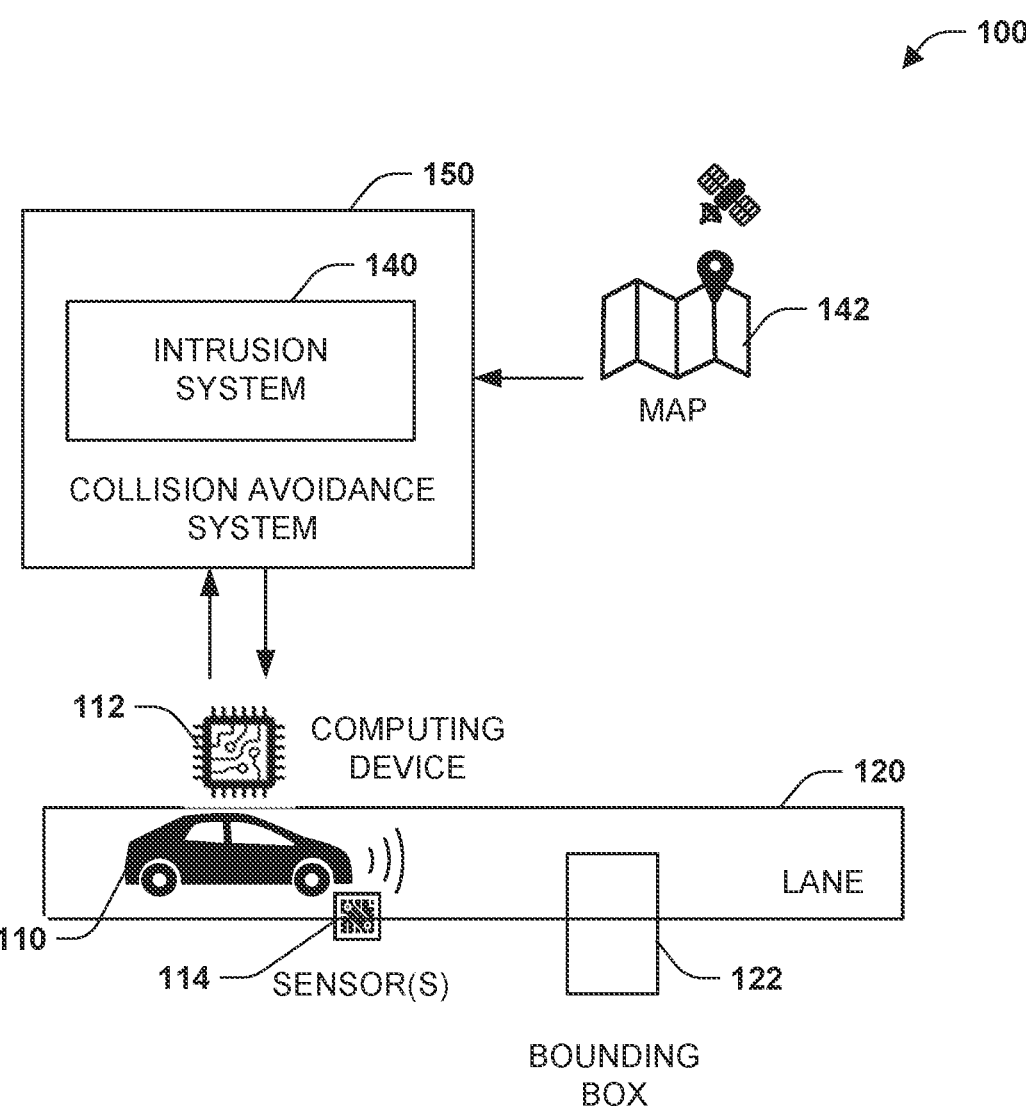
FIG. 1 depicts an example implementation of intrusion-based avoidance according to one or more embodiments shown and described herein.

FIG. 1 depicts a high-level overview of an example implementation 100 of aspects associated with collision avoidance or mitigation. The example implementation 100 includes vehicle 110, computing device 112, sensor 114, lane 120, bounding box 122, intrusion system 140, map 142, and collision avoidance system 150.

The vehicle 110 is a machine designed to transport people or goods from one place to another. Internal combustion engines or electrical motors can power the vehicle 110. Types of vehicles include cars, trucks, and motorcycles, among others. Although not limited thereto, the vehicle can be an autonomous vehicle capable of operating with little or no human input in one example embodiment. The vehicle 110 can include a computing device 112 and one or more sensors 114.

The computing device 112 includes one or more processors configured to execute one or more instructions stored in memory to perform various functions. In accordance with one embodiment, the computing device 112 can correspond to an electronic control unit (ECU) or engine control module (ECM) specialized for managing and controlling various functions of vehicle operation, such as engine control, transmission control, anti-lock braking, airbags, stability control, climate control, and driver assistance systems. Although a single device is depicted, it is to be appreciated that the vehicle 110 can include a plurality of electronic control units dedicated to various subsystems. The computing device 112 can receive and utilize input from one or more sensors 114 to affect vehicle performance, and overall functionality. Further detail regarding the computing device 112 is presented later herein with reference to FIG. 9.

The sensors 114 gather data regarding a vehicle's surroundings or internal components and provide the data to the computing device 112. Example vehicle sensors 114 include proximity sensors, cameras, radar sensors, LiDAR sensors, ultrasonic sensors, accelerometers, wheel spin sensors, temperature sensors, and a global positioning system (GPS). The sensors 114 collectively contribute to enabling response to various conditions and provide an improved driving experience.

In operation, the vehicle 110 can travel on roadways within the lane 120. The lane 120 refers to a marked or designated path on a roadway intended for movement of vehicles within a defined space. A lane 120 is often marked with lines, or lane lines, painted on pavement (e.g., solid lines, dashed lines, double lines, different color lines) to help organize and regulate traffic flow. There are various types of lanes, including traffic, turning, and bus lanes. In accordance with one embodiment, the lane 120 can correspond to a traffic lane on a road used to control the general flow of traffic by predictably guiding drivers.

The collision avoidance system 150 is a technology designed to help prevent or mitigate collisions between a vehicle and an object, such as another vehicle or pedestrian.

The collision avoidance system 150 is embodied as software, hardware, or a combination of software and hardware and executed by the computing device 112. In accordance with one embodiment, the collision avoidance system 150 can be executed by a dedicated electronic control unit and optionally integrated into or part of an advanced driver assistance system. The collision avoidance system 150 can detect objects, provide visual or auditory warnings to alert a driver, and automatically apply vehicle brakes. For example, the collision avoidance system 150 can detect the presence of an object in the lane 120 and automatically apply the brakes to avoid or limit the severity of a collision. However, conventional collision avoidance systems lack precision or accuracy and can suffer from significant false positives.

The intrusion system 140 is configured to quantify an extent to which an object occupies or unoccupies the lane 120. Stated differently, the intrusion system 140 can determine how much of the lane 120 is blocked by an object or is unblocked and available. As shown, the intrusion system 140 can be a subsystem or component of the collision avoidance system 150. Alternatively, the intrusion system 140 can be a separate system or component that can interact with the collision avoidance system 150.

In one instance, the intrusion system 140 can generate a bounding box 122 that captures the size and position of an object detected within the lane 120 based on sensor data from sensors 114 on the vehicle 110, other vehicles, third parties (e.g., traffic cameras), or a combination thereof. The object can be another vehicle, pedestrian, or other obstacle detected by at least one sensor 114, such as a camera or radar sensor. The lane 120 can be determined based on reference to a map 142, data acquired from one or more sensors 114, or both. For example, vehicle location can be determined by a global positioning system (GPS), and the map 142 can be referenced to determine the lane 120, where vehicle 110 is traveling. Further, camera data can be analyzed to confirm or further identify a lane amongst multiple lanes in which the vehicle is traveling. In accordance with one embodiment, the collision avoidance system can determine the lane or generate the bounding box 122 and the intrusion system 140 can receive such information from the collision avoidance system 150.

After the bounding box 122 is determined, the bounding box 122 can be utilized to compute the extent to which an object or obstacle occupies the lane 120. Each vertex of the bounding box 122 can be analyzed to determine the distance from the left and the right of the lane 120. More specifically, a vertex can be projected to the left lane line and the right lane line. A ratio that captures how much the vertex intrudes into the lane from the left, right, or both can be determined in one instance. The vertex ratios can subsequently be utilized to compute a metric, such as an intrusion metric, that quantifies how much lane is occupied or unoccupied by an object.

The intrusion system 140 alone or in combination with the collision avoidance system 150 can utilize the computed metric as a basis for intervention alone or in combination with other factors. For instance, the metric can be compared to a threshold and utilized to trigger a visual or auditory alert or intervene to apply brakes or perform invasive steering. In one instance, the metric can be utilized as an additional factor considered by the collision avoidance system 150 that improves the performance of the collision avoidance system 150 by at least reducing false positives.

Example Implementation of an Intrusion System

Figure 2:
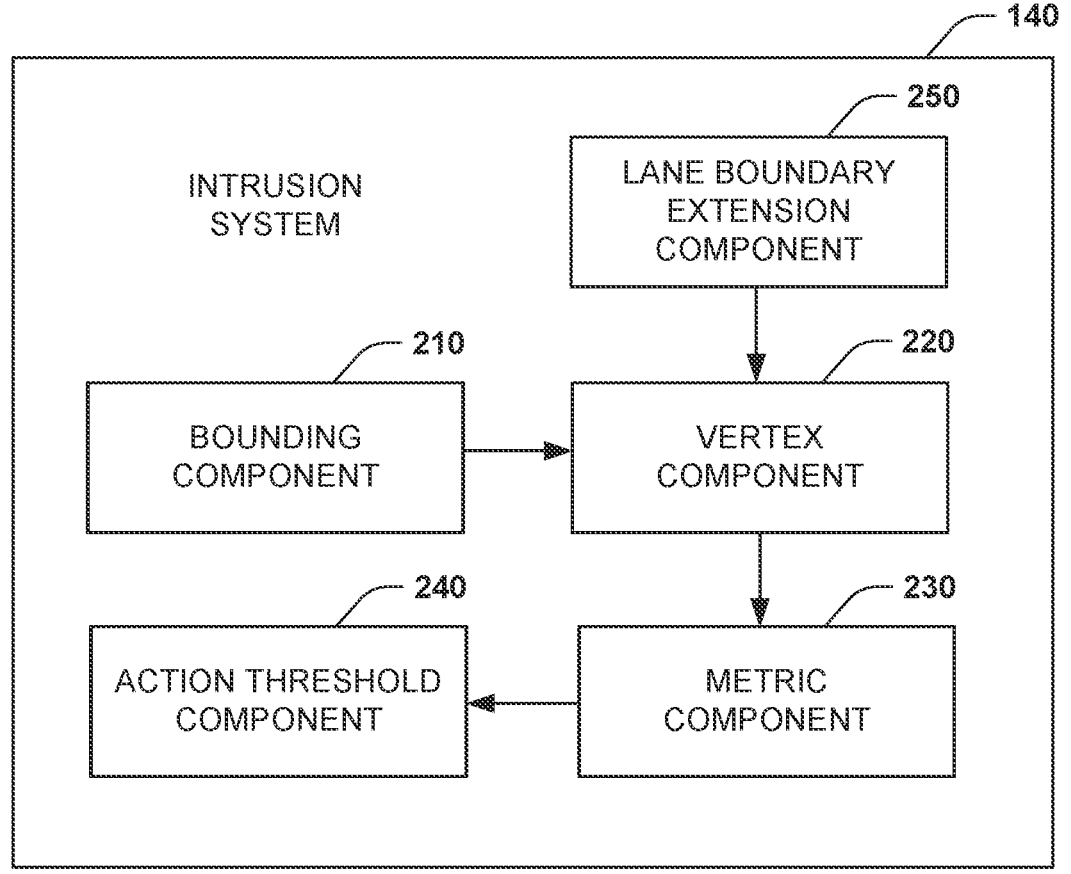
FIG. 2 illustrates an example intrusion system according to one or more embodiments shown and described herein.

FIG. 2 illustrates a block diagram of an example implementation of the intrusion system 140 briefly described in FIG. 1. In the depicted example, the intrusion system 140 includes bounding component 210, vertex component 220, metric component 230, action threshold component 240, and lane boundary extension component 250. The bounding component 210, vertex component 220, metric component 230, action threshold component 240, and lane boundary extension component 250 can be implemented by at least one processor coupled to at least one memory that stores instructions that, when executed by the at least one processor, cause the processor to perform the functionality of each component when executed. Consequently, a computing device can be configured to be a special-purpose device or appliance that implements the functionality of the intrusion system 140. Further, all or portions of the intrusion system 140 can be distributed across computing devices or made accessible through a network service.

The bounding component 210 is configured to generate bounding box 122 that encapsulates an object or obstacle, such as a vehicle or pedestrian. The bounding box 122 can be generated based on analysis of local vehicle sensor data, external sensor data, or both including camera images or video. For example, an object's shape, size, and orientation can be determined through image processing of images provided by cameras mounted on a vehicle as well as traffic cameras or other sensors. In one instance, object detection can be employed by the bounding component 210, which employs computer vision and image processing techniques to detect instances of particular objects, such as vehicles or humans, in digital images and videos. Once an object is detected, the bounding component 210 can determine the size and orientation of a box that encompasses the object. For example, one or more imaging depth cameras can be employed that are capable of capturing depth measurements. Although the term "box" is used herein for clarity, any polygon (e.g., geometric object comprising any number of sides and vertices) can be employed to generate a bounding polygon.

The vertex component 210 is configured to analyze the vertices of a bounding box or polygon. More specifically, vertex component 210 is configured to compute distances for each vertex of a bounding box 122 from the left and right sides of a lane. A vertex can be projected to a lane line in a straight line perpendicular or substantially perpendicular to the lane line. The difference between the original and projected vertex can be the distance determined based on a Euclidean distance computation between points, for example. In accordance with one embodiment, the vertex component 210 can generate a ratio for each vertex, such as a right-to-left ratio, left-to-right ratio, or both.

Figure 3:
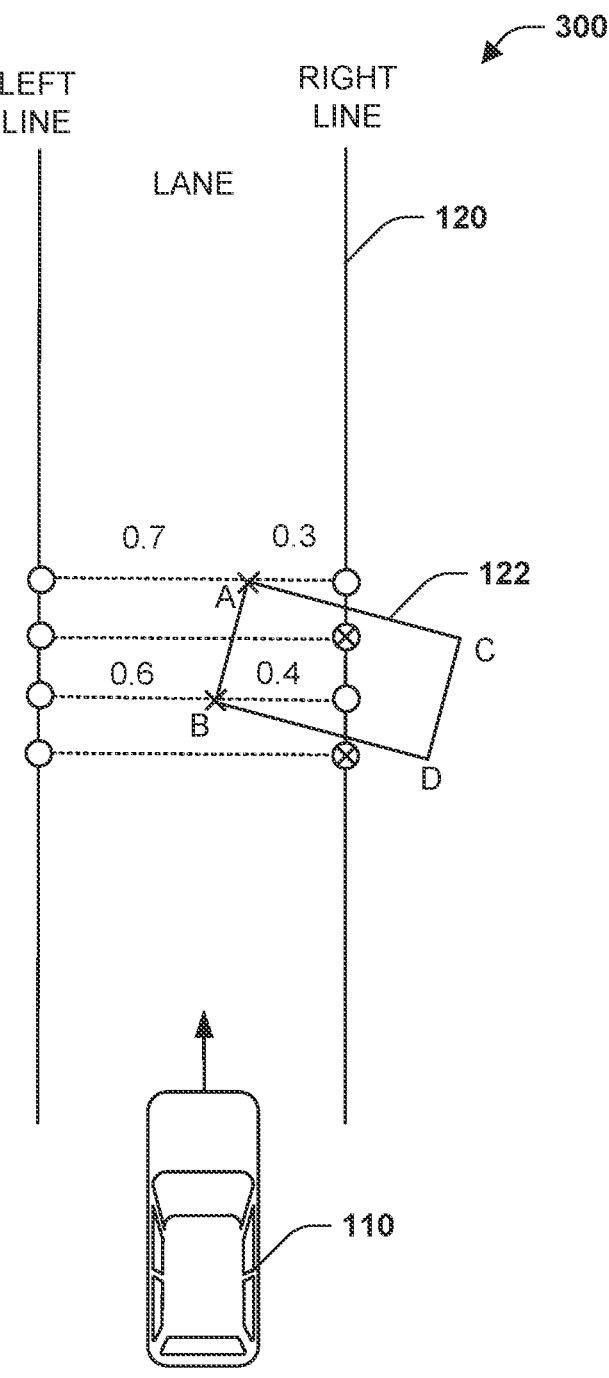
FIG. 3 depicts an example scenario involving a lane obstacle and vertex computation according to one or more embodiments shown and described herein.

Turning attention to FIG. 3, an example scenario 300 is illustrated to facilitate clarity and understanding. As shown, the example scenario 300 includes the vehicle 110 traveling upward in lane 120. Further, the example scenario 300 shows an object or obstacle in the road encapsulated in bounding box 122. For example, the bounding box 122 can represent another vehicle pulling in or out of a driveway. The bounding box 122 has four vertices: top left "A," bottom left "B," top right "C," and bottom right "C." The top left vertex "A" and bottom left vertex "B" reside in the lane, while the top right vertex "C" and bottom right vertex "B" reside outside the lane 120. The vertex component 210 can first process vertex A by projecting the vertex to a point on the left lane line and a point on the right lane and determining the left-to-right ratio to be 0.7 or 70% and the right-to-left ratio to be 0.3 or 30% based on a distance computation. Next, vertex "B" can be projected to the left and right lines. The vertex component 220 can also determine the left-toright ratio to be 0.6 or 60% and the right-to-left ratio to be 0.4 or 40% based on distance computation. As per vertices "C" and "D" outside lane 120, the projection can be to the right lane line. As a result, the left-to-right ratio can be 1.0 or 100%, and the right-to-left ratio can be 0.0 or 0% for both vertices "C" and "D."

Returning to FIG. 2, the metric component 230 is configured to determine a metric, such as an intrusion metric, based on input from the vertex component 220. In one embodiment, the metric can correspond to how much an object or obstacle intrudes into a lane as a percentage of the total lane width. In this instance, the metric component 220 can analyze the ratios associated with the vertices to produce an intrusion ratio as the metric. For example, the intrusion ratio of an object can be the minimum of intrusion from the left lane line to the rightmost point and intrusion from the right lane line to the leftmost point. Intrusion from the left lane line to the rightmost point can correspond to the maximum left-to-right ratio. Intrusion from the right lane line to the leftmost point can correspond to the right-to-left ratio. In one instance, the determination can ignore vertices that are outside the lane.

In the example scenario 300 of FIG. 3, intrusion from the left lane to the rightmost point corresponds to 0.7, and intrusion from the right lane line to the leftmost point corresponds to 0.4. The metric component 230 can select the minimum as 0.4, or 40% as a percentage, as the metric. In this instance, the metric captures how much the object is intruding into the lane 120 relative to the total lane width. Alternatively, the metric can correspond to how much available space remains given intrusion of the object in the lane. In this instance, the minimum of 0.4 can be subtracted from 1.0 to return 0.6 or 60% as the metric. In other words, the object intrudes on 40% of the lane width while 60% of the lane width remains open or unoccupied.

The action threshold component 240 is configured to initiate or trigger action as a function of the metric and one or more predetermined thresholds corresponding to one or more actions. Example actions include a driver alert or warning and intervention to apply brakes or perform evasive steering. For instance, a warning can be generated and presented if a metric specifies that less than 90 percent of lane width is available due to an obstacle. Additionally or alternatively, if the metric specifies that half or less than half of the lane is available, automatic braking can be engaged. As another example, if the metric specifies that more than 90% of lane width is available, evasive steering can be performed to maneuver around an obstacle in the lane.

The lane boundary extension component 250 is configured to extend the length of lane lines considered in different situations. One situation involves road intersections involving a lane that travels through an intersection. The extended length can be a predetermined value in one instance.

Figures 4A, 4B:
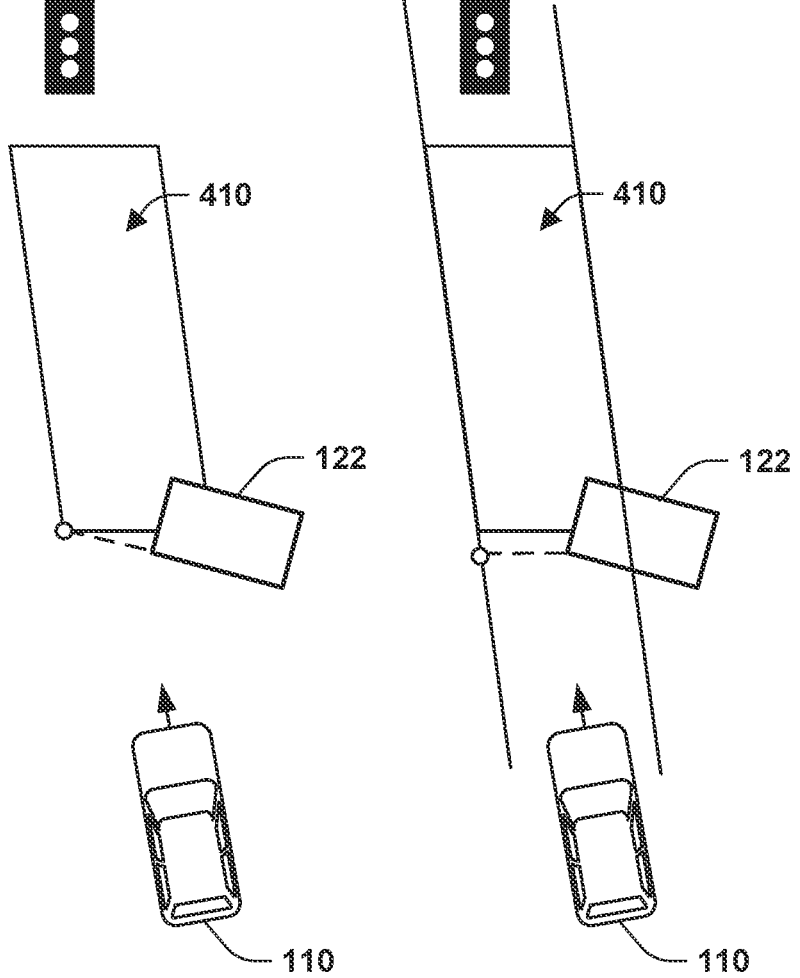
FIG. 4A-B illustrate example lane extension according to one or more embodiments shown and described herein.

Turning attention to FIGS. 4A-B, two intersection scenarios are depicted. In FIG. 4A, an intersection lane 410 is shown with a bounding box 122 representing an object or obstacle in the lower right portion. In this situation, the bottom left vertex can be projected to the bottom right of the intersection lane 410 when processed by the vertex component 220 of FIG. 2. The projection can be inaccurate and negatively impact a generated metric, such as an intrusion ratio. To address this issue, the lane boundary extension component 250 can extend the lane lines a predetermined distance beyond the intersection. FIG. 4B illustrates extended lane lines. As depicted, the projection of the left bottom vertex of the bounding box 122 can be to the extended lane line perpendicular to the lane line. In this manner, errors in metric computation can be avoided.

Figure 5:
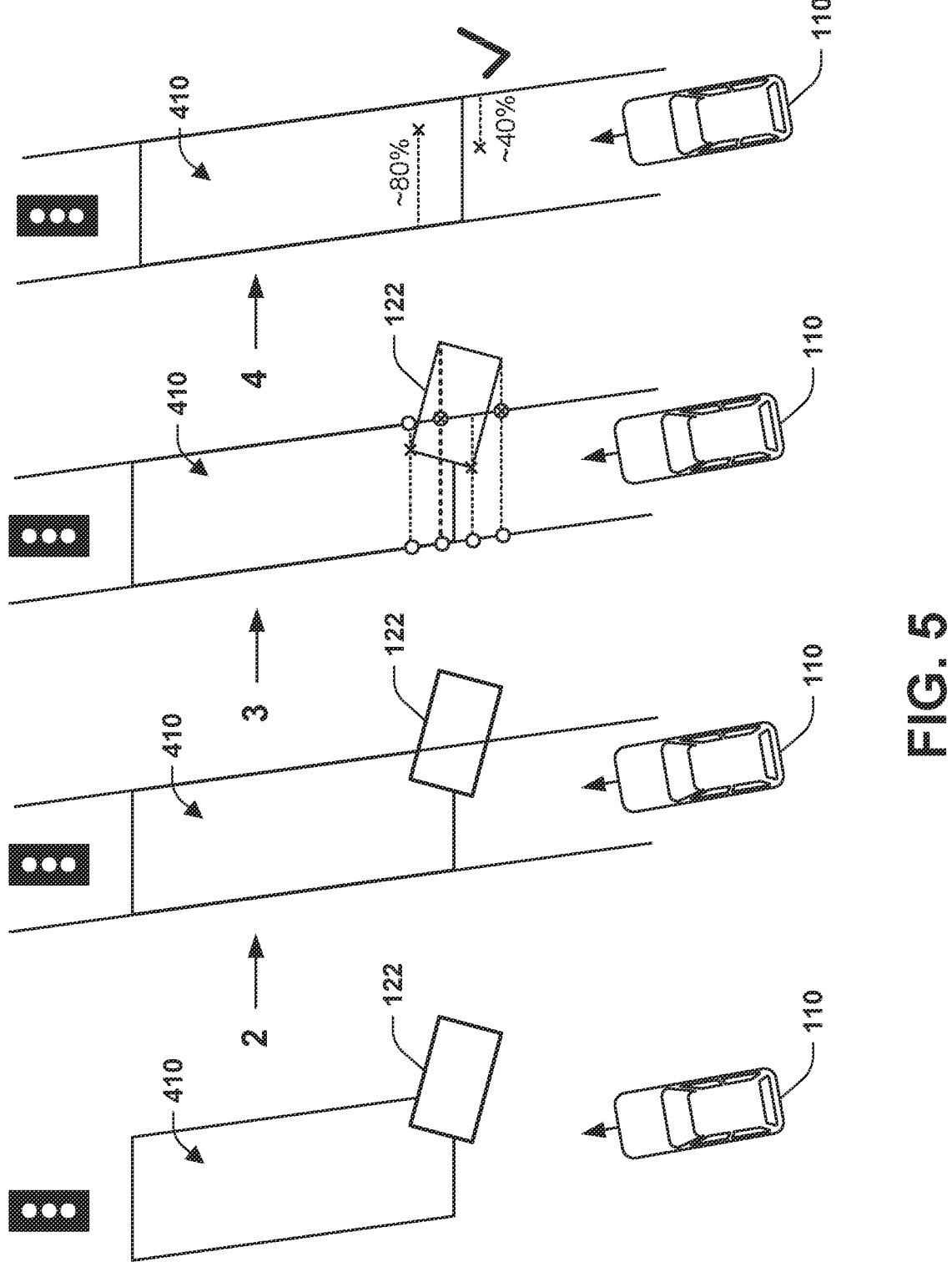
FIG. 5 depicts example intrusion system operations for a lane obstacle in an intersection according to one or more embodiments shown and described herein.

FIG. 5 graphically depicts example operations of the intrusion system 140 for an object in an intersection. At numeral 1, an intersection lane 410 is depicted with a bounding box 122 and vehicle 110 traveling upward toward the interaction. At numeral 2, the lane boundary extension component 250 extends the lane lines. At numeral 3, the vertex component 220 processes the vertices of the bounding box 122 by projecting the vertices to the line lines and computing one or more ratios associated with each vertex. At numeral 4, the metric component 230 generates a metric based on the output of the vertex component 220. As shown, intrusion from the left to the rightmost point is identified as approximately 80%, and intrusion from the right to the leftmost point is approximately 40%. The minimum of the two values can be selected as 40% and returned as the metric representing how much the object is intruding or occupying lane width. Alternatively, the minimum of 40% can be subtracted from 100% to return 60% as a metric representing available lane width space not occupied by the object.

Example Methods of Intrusion-Based Collision Avoidance

Figure 6:
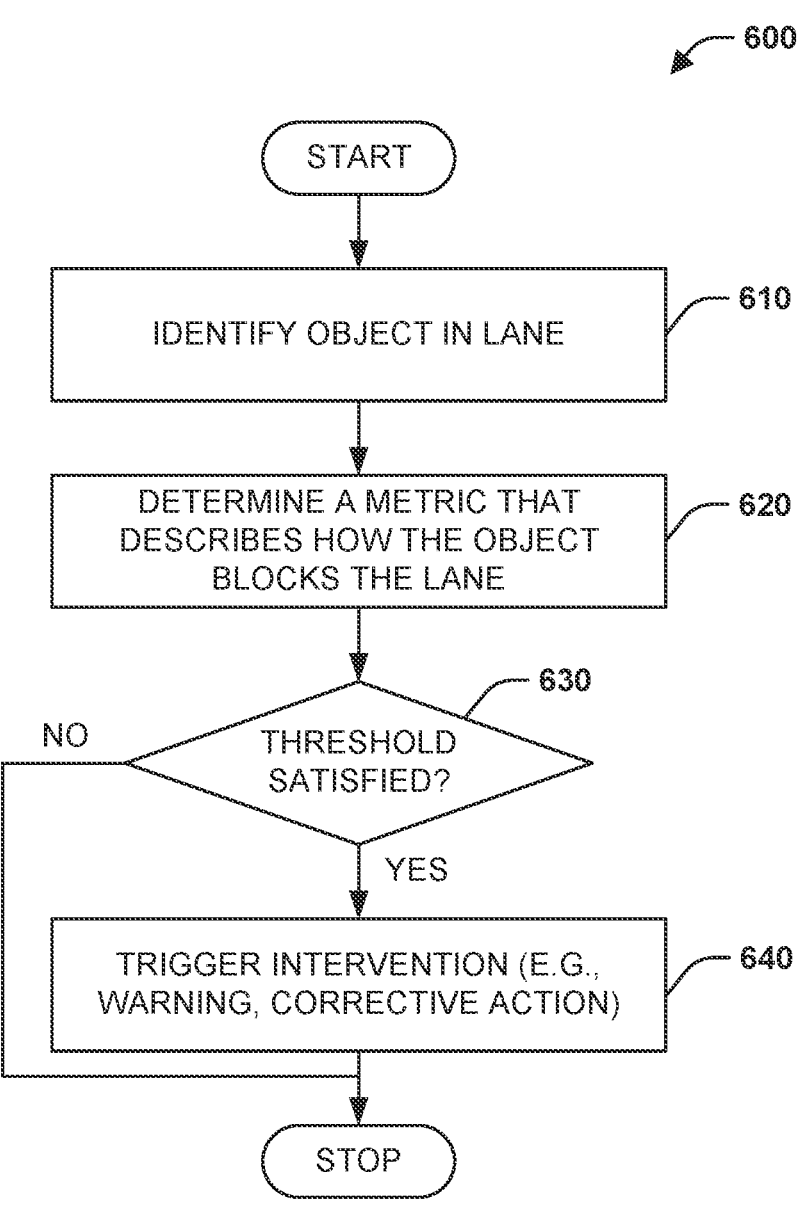
FIG. 6 is flow diagram of an example method of collision avoidance according to one or more embodiments shown and described herein.

Turning to FIG. 6, an illustrative flow diagram depicts an example method 600 for collision avoidance or mitigation. The method 600 can be executed by the collision avoidance system 150 of FIG. 1.

The method 600 starts at block 610 by identifying an object or obstacle in a lane. An object can be identified based on data from one or more sensors. The sensors can correspond to cameras, light detection and ranging (LiDAR) systems, radar, or a combination thereof. Further, machine learning and computer vision technologies may be utilized to analyze data collected by sensors to identify objects such as other vehicles, pedestrians, and cyclists.

The method 600 continues at block 620 by determining a metric that describes how the object blocks the lane. The object may partially or fully block the lane. Additionally, an object may be small and block only a portion of the lane but may be centrally located, blocking a significant portion of the lane. In accordance with one embodiment, the metric can capture the available space in terms of lane width, given the object's presence, size, and position in the lane. In this manner, the metric can quantify how the object blocks a lane. Further details regarding the metric determination are presented in the following flow diagram of FIG. 7.

Next, the method 600 proceeds to block 630 with a decision regarding whether or not the metric satisfies one or more thresholds. One or more threshold values can be predetermined. The metric value can be compared to one or more threshold values to determine whether a threshold is satisfied or unsatisfied. For example, a threshold value can quantify that the object occupies more than 90% of a lane. The metric value can be compared to the threshold value to determine whether the threshold is satisfied or not. If the threshold is satisfied, the method 600 can continue to block 640. If the threshold is not satisfied, the method 600 can terminate.

The method 600 can proceed to block 640 when the threshold is satisfied. At block 640, the method 600 triggers intervention. The intervention can be in the form of a driver warning or alert or corrective action such as applying vehicle brakes or performing evasive steering, among other things. Different thresholds can be specified for different forms of intervention or combinations. For example, a threshold can be specified that is associated with alerting a driver, automatically applying a vehicle brake, or both, while a different threshold can be associated with evasive steering.

Note that FIG. 6 is just one example of a method, and other methods including fewer, additional, or alternative steps are possible consistent with this disclosure.

Figure 7:
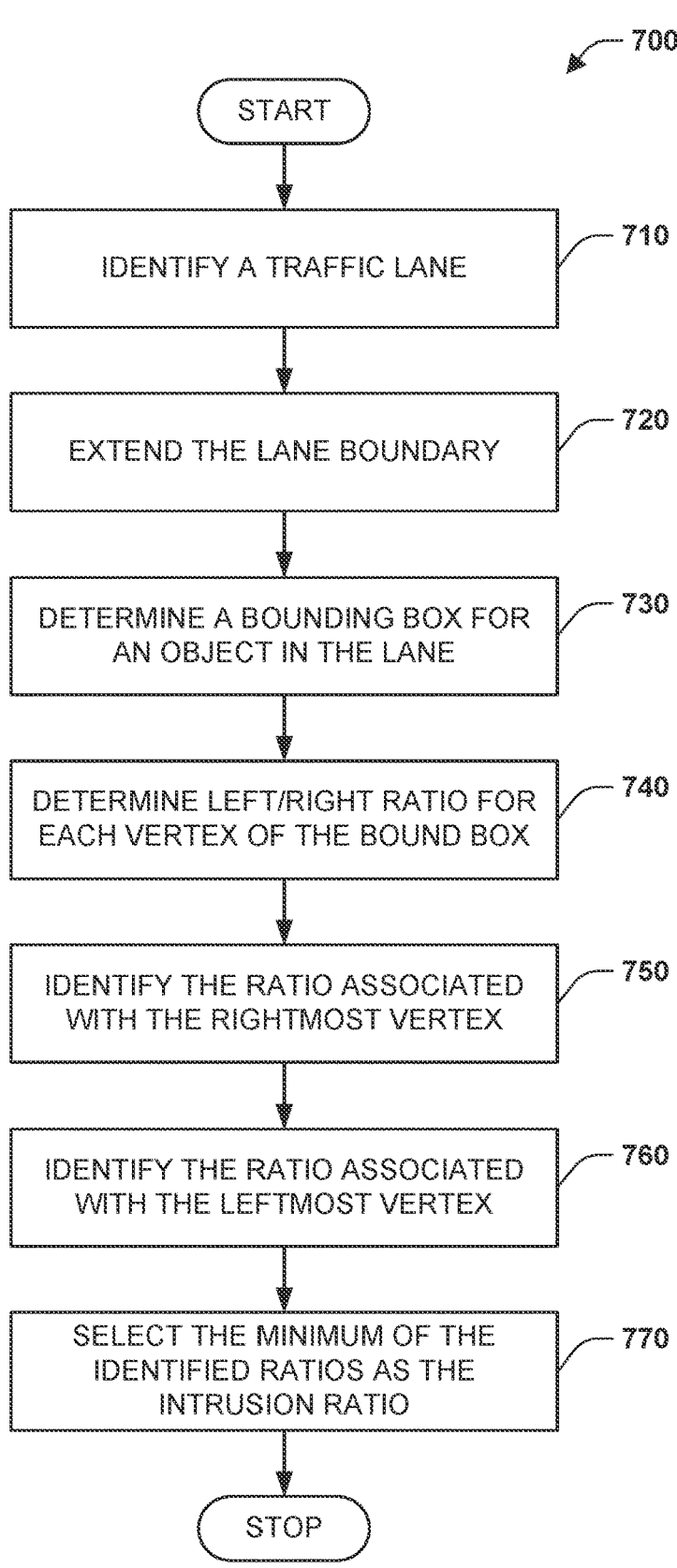
FIG. 7 is a flow diagram of an example method of determining a metric that describes how an object blocks a lane.

FIG. 7 depicts an illustrative flow diagram of an example method 700 for determining a metric that describes how an object blocks a lane. The method 600 can be executed by the intrusion system 140 of FIGS. 1 and 2 including the bounding component 210, vertex component 220, metric component 230, and lane boundary extension component 250.

The method 700 starts at block 710, identifying the traffic lane in which a vehicle is currently traveling. In accordance with one embodiment, a global positioning system associated with the vehicle can be employed to receive coordinates that provide a precise geographic location. The coordinates can be analyzed with reference to a digital map that identifies traffic lanes and intersections, among other things, to identify the traffic lane. Additionally or alternatively, sensor data such as images or video can be analyzed to determine a particular traffic lane among many of a road, for example, based on analysis of lane lanes painted on a road.

The method 700 continues at block 720 with extending lane boundary lines. If a vehicle is about to enter an intersection, the lane portion through solely the intersection may not provide enough data to perform further processing accurately. Accordingly, the lane lines considered can be extended before and after the intersection. For example, the lane lines considered can be ten meters before and after the intersection.

The method 700 can proceed at block 730 with determining a bounding box for an object detected to be present in the lane the vehicle is traveling. The bounding box can be a rectangle, square, or any other polygon encompassing an object. The bounding box can capture an object's size, shape, and position relative to the lane. The bounding box can be generated by a machine learning model trained to detect objects in an image or video. Further sensor data, for example, from radar, LIDAR, or an imaging depth camera can also be utilized to refine the bounding box. The bounding box can be specified with respect to the center of an object as well as at least the object's length and width.

The method 700 continues at block 740 with determining ratios for each vertex of the bounding box. Each vertex can be projected to a left lane line and a right lane line substantially perpendicular thereto. Subsequently, a Euclidean distance computation can be performed to determine the distance between two points, namely the vertex and the left lane line projection and the vertex and the right lane line projection. A ratio can be determined based on the distance to quantify the extent to which an object intrudes into the lane as a percentage of the total lane width. More specifically, a left-to-right ratio can be determined that represents the distance between the left lane line and a vertex. In one instance, the vertices of a bounding box that reside outside a lane need not be considered or can be assigned a left-to-right ratio of 1.0 and a right-to-left ratio of 0.0 for vertices that are beyond the right lane line and vice versa for vertices that are beyond the left lane line. Further, a left-to-right ratio can be determined that represents a relative distance between the right lane line and a vertex. In accordance with one embodiment, one of the left-to-right or right-to-left ratios can be determined and the other ratio can be determined by subtracting the ratio from 1.0 or 100 if the ratio is represented as a percentage. For example, if the left-to-right ratio is 0.6 (or 60%), then the right-to-left ratio is "1.0-0.6" or 0.4 (or 40%).

The method 700 continues at block 750 with identifying the ratio associated with the rightmost vertex. The ratio can be identified by locating the maximum left-to-right ratio amongst bounding box vertices.

Next, the method 700 proceeds at block 760 with identifying the ratio associated with the leftmost vertex. The ratio can be determined by identifying the maximum right-to-left ratio amongst vertices of the bounding box.

The method 700 continues to block 770 with selecting the minimum of the rightmost ratio and the leftmost ratio as the intrusion ratio. For example, consider an object entirely contained within the lane (e.g., no portion outside the lane) with a rightmost point ratio of 60% and a leftmost point ratio of 90%. In this scenario, the intrusion ratio is 60%, meaning the object occupies 40% of the lane width with 60% of the lane available. Subsequently, the method 700 can terminate.

Note that FIG. 7 is just one example of a method, and other methods including fewer, additional, or alternative steps are possible consistent with this disclosure.

Example Intrusion Ratio Determinations

Figures 8A, 8B, 8C, 8D:
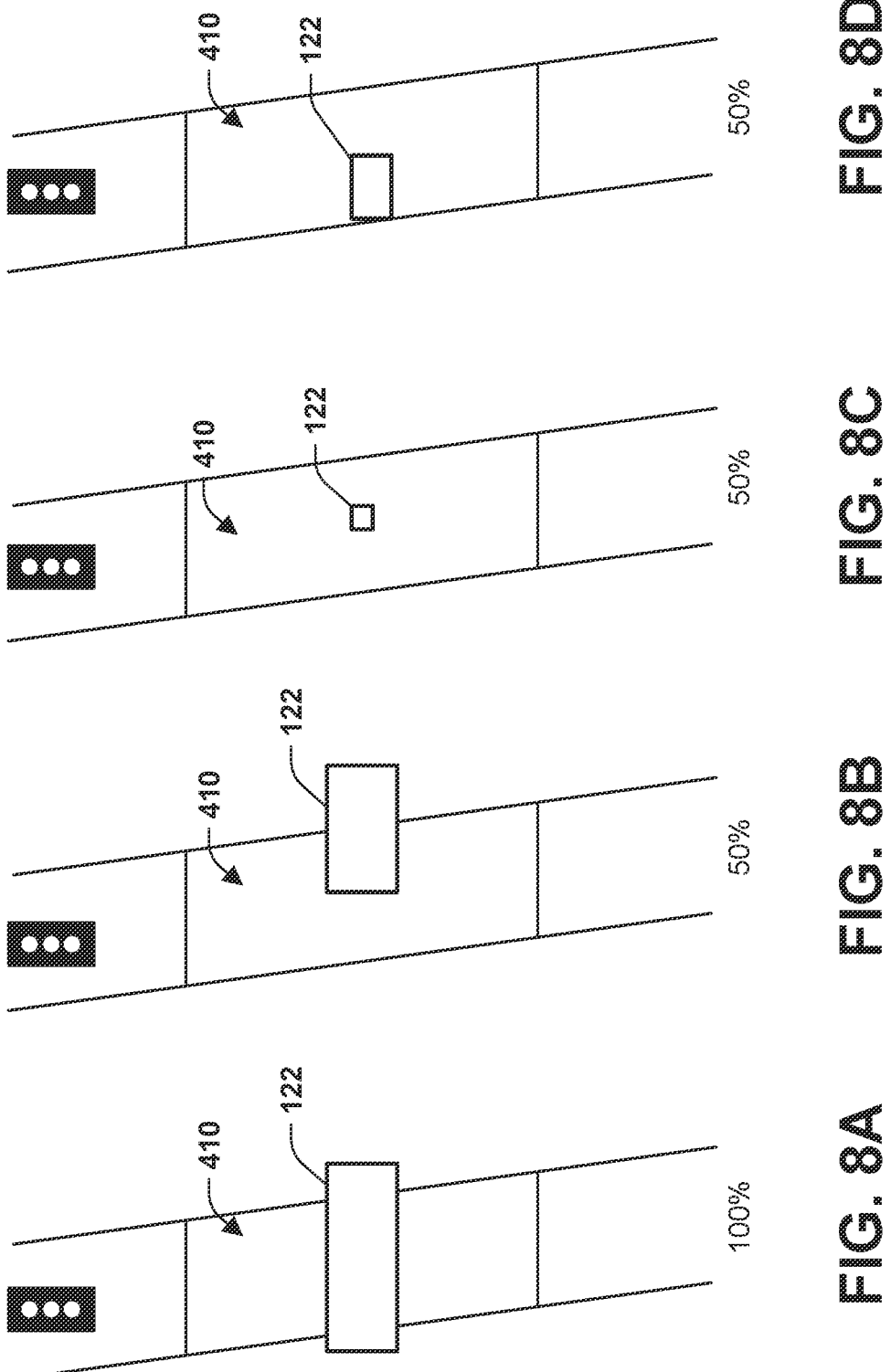
FIG. 8A-D illustrates example intersections with various object intrusions according to one or more embodiments shown and described herein.

FIGS. 8A-D illustrated example intersections with object intrusions to aid clarity and understanding regarding determining an intrusion ratio. Each figure depicts an intersection 410 with extended lane lines and a particular bounding box 122. FIG. 8A depicts a bounding box 122 for an object that extends beyond intersection lane lines on both sides. In this scenario, the intrusion ratio as a percentage is 100%. FIG. 8B illustrates a bounding box 122 that appears halfway inside the right lane line of the intersection and halfway outside the right lane line of the intersection. Here, the intrusion ratio as a percentage of the lane width is 50%. FIG. 8C depicts a smaller bounding box than those in FIGS. 8A and B, but is centrally located in the middle of the intersection lane lines. The intrusion ratio as a percentage for this small centrally disposed bounding box 122 is also 50%. FIG. 8D depicts a bounding box 122 located on the left side of the intersection lane lines extending about halfway between the left and right lane lines. In this situation, the intrusion ratio as a percentage is also 50%.

For simplicity and clarity, bounding boxes have be depicted and discussed for a single object or obstacle often moving from right to left. It is to be appreciated that the metric is agnostic to the direction of intrusion. Further, the metric can be a composite metric accounting for more than one object or obstacle in a lane or intersection.

Example Processing System for Intrusion-Based Collision Avoidance

Figure 9:
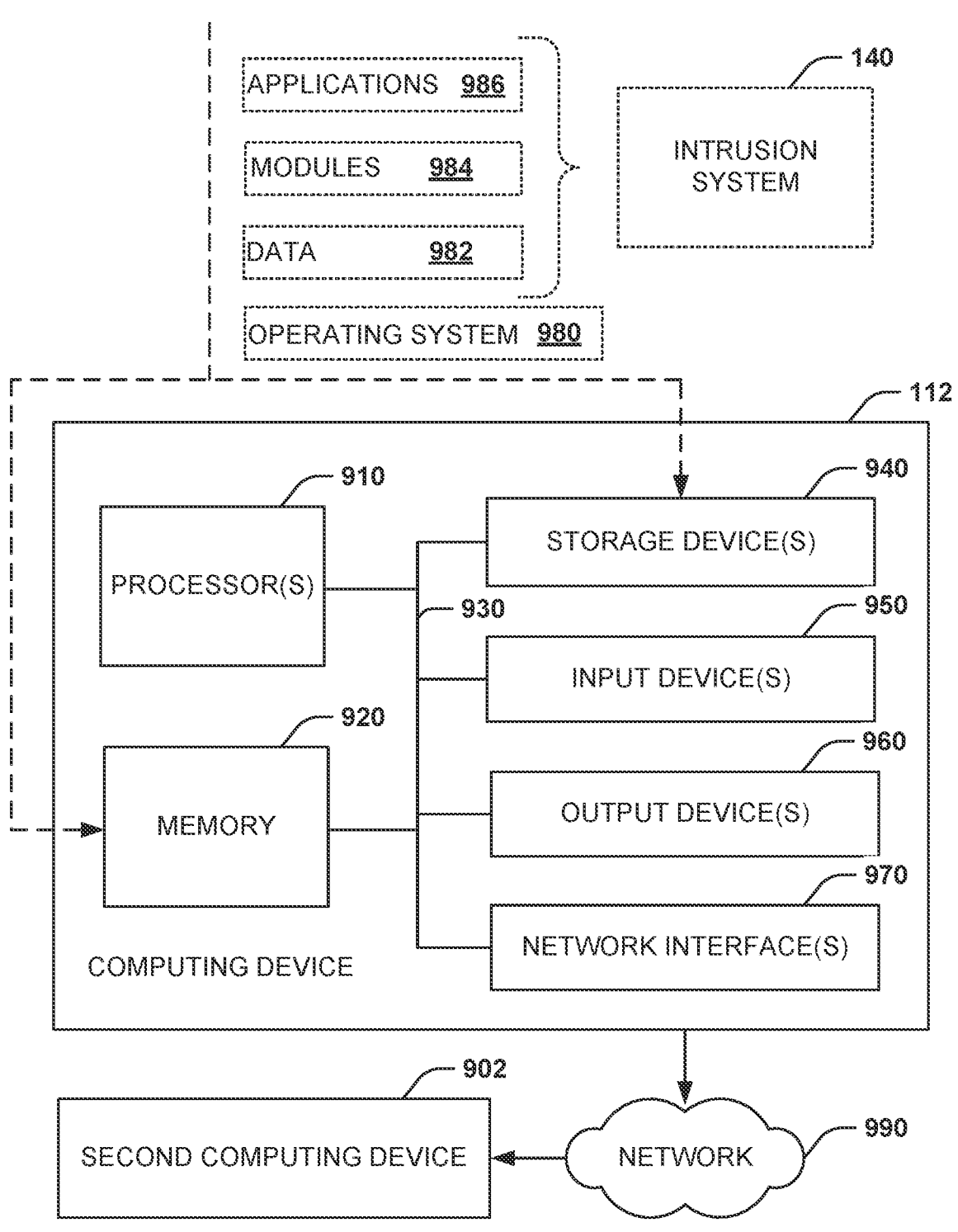
FIG. 9 is a block diagram of an example operating environment within which aspects of the subject disclosure can be performed according to one or more embodiments shown and described herein.

FIG. 9 depicts an example processing system configured to perform various aspects described herein, including, for example, methods as described above with respect to FIGS. 7 and 8.

To provide a context for the disclosed subject matter, FIG. 9, as well as the following discussion, are intended to provide a brief, general description of a suitable environment in which various aspects of the disclosed subject matter can be implemented. The suitable environment is solely an example and is not intended to suggest any limitation on the scope of use or functionality.

With reference to FIG. 9, illustrated is an example computing device 112. The computing device 112 includes one or more processor(s) 910, memory 920, bus 930, storage device(s) 940, input device(s) 950, output device(s) 960, and network interface(s) 970. The bus 930 communicatively couples at least the above system constituents. However, the computing device 112, in its simplest form, can include one or more processors 910 coupled to at least one memory 920, wherein the one or more processors 910 execute various computer-executable actions, instructions, and or components stored in the memory 920 and retrieved from storage devices 940.

The bus 930 may be formed from any medium capable of transmitting a signal, such as conductive wires, conductive traces, optical waveguides, connectors, or the like. In one embodiment, the bus 930 comprises a combination of conductive traces, conductive wires, connectors, and cooperate to permit the transmission of electrical data signals to components such as the processor(s) 910, memory 920, storage device(s) 940, input device(s) 950, output device(s) 960, and network interface(s) 970.

The processor(s) 910 can be implemented with a general-purpose processor, a microprocessor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 910 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 910 can be a graphics processor unit (GPU) that performs calculations concerning digital image processing and computer graphics.

The computing device 112 can include or otherwise interact with a variety of computer-readable media to facilitate control of the computing device 112 to implement one or more aspects of the disclosed subject matter. The computer-readable media can be any available media accessible to the computing device 112 and includes volatile and nonvolatile media and removable and non-removable media. Computer-readable media can comprise two distinct and mutually exclusive types: storage media and communication media.

Storage media includes volatile and nonvolatile, removable and non-removable media implemented in any method or technology to store information such as computer-readable instructions, data structures, program modules, or other data. Storage media includes memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like mediums that store, as opposed to transmit or communicate, the desired information accessible by the computing device 112. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 can be volatile (e.g., random access memory (RAM)), nonvolatile (e.g., read-only memory (ROM), flash memory . . . ), or some combination of the two. By way of example, the basic input/output system (BIOS), including basic routines to transfer information between elements within the computing device 112, such as during start-up, can be stored in nonvolatile memory. By contrast, volatile memory can act as external cache memory to facilitate processing by the processor(s) 910, among other things.

The storage device(s) 940 include removable/non-removable, volatile/nonvolatile storage media for storing vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 can control and allocate resources of the computing device 112. Applications 986 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer into a specialized machine according to the logic provided.

All or portions of the disclosed subject matter can be implemented using standard programming and/or engineering techniques to produce software, firmware, hardware, or any combination thereof to control the computing device 112 to realize the disclosed functionality. By way of example and not limitation, all or portions of intrusion system 140 of FIGS. 1 and 2 can be, or form part of, the application 986 and include one or more modules 984 and data 982 stored in memory and/or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory, at least similar to the processor(s) 910 and memory 920, among other things. Conventional processors include minimal hardware and software and rely extensively on external hardware and software. By contrast, a SOC implementation of a processor is more powerful, as it embeds hardware and software therein that enable particular functionality with minimal or no reliance on external hardware and software. For example, the intrusion system 140 or functionality associated therewith can be embedded within hardware in a SOC architecture.

The input device(s) 950 and output device(s) 960 can be communicatively coupled to the computing device 112. By way of example, the input device(s) 950 can include a pointing device (e.g., mouse, trackball, stylus, pen, touchpad), keyboard, joystick, microphone, voice user interface system, camera, sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 112 by way of a wired connection (e.g., bus), wireless connection (e.g., Wi-Fi, Bluetooth), or a combination thereof.

The computing device 112 can also include network interface(s) 970 to enable communication with at least a second computing device 902 utilizing a network 990. The network interface(s) 970 can include wired or wireless communication mechanisms to support network communication. The network 990 can correspond to a personal area network (PAN), local area network (LAN), or a wide area network (WAN), such as the Internet. In one instance, the computing device 112 can correspond to a first computing device executing the intrusion system 140 associated with a collision avoidance system 150. The second computing device 1102 can correspond to a server that provides a map or external sensor data for use by the intrusion system 140.

In accordance with one particular embodiment, the computing device 112 can correspond to an electronic controller, such as an electronic control unit (ECU) associated with vehicles including autonomous vehicles. The ECU can be specifically designed for specialized, real-time control over vehicle functions in harsh conditions (e.g., temperature variations, vibration, electromagnetic interference). In one instance, the ECU implements an advanced driver assistance system, including the collision avoidance system 150 and intrusion system 140. In this instance, the ECU can include one or more processor(s) 910 that execute machine-executable code stored in the memory 920 to perform logic described with respect to the intrusion system 140. Further, the one or more processor(s) 910 can be communicatively coupled by way of the bus 930 to input devices such as one or more cameras.

A camera may be any device with an array of sensing devices (e.g., pixels) capable of detecting radiation in an ultraviolet wavelength band, a visible light wavelength band, or an infrared wavelength band. The camera may be an omnidirectional camera or a panoramic camera, for example. In some embodiments, the camera may be an imaging depth camera such as an RGB-D (e.g., an Intel® RealSense™ Depth Camera) or another device capable of capturing depth measurements in an environment or capturing image data capable of being analyzed to determine depths in an environment based on the image data. In some embodiments, one or more optical components, such as a mirror, fish-eye lens, or any other lens type, may be optically coupled to each camera.

The functional blocks and/or flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC) or their equivalents. Accordingly, the functionality described herein may be implemented in any conventional computer programming language, as pre-programmed hardware elements, or as a combination of hardware and software components.

Additional Considerations

The preceding description is provided to enable any person skilled in the art to practice the various embodiments described herein. The examples discussed herein do not limit the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from those described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The methods disclosed herein comprise one or more steps or actions for achieving the methods. The method steps or actions may be interchanged with one another without departing from the scope of the claims. In other words, unless a specific order of steps or actions is specified, the order or use of specific steps or actions may be modified without departing from the scope of the claims. Further, the various operations of methods described above may be performed by any suitable means capable of performing the corresponding functions. The means may include various hardware or software component(s) or module(s), including, but not limited to a circuit, an application specific integrated circuit (ASIC), or a processor. Generally, where operations are illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later become known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

What is claimed is:

1. A method, comprising:
generating a bounding box that captures size and position of an object in a lane comprising a left lane line and right lane line;
computing a metric that captures an extent to which the object intrudes on the lane based on one or more vertices of the bounding box by:
projecting each vertex of the one or more vertices of the bounding box to the left lane line and the right lane line;
determining a distance of each vertex to the left lane line and right lane line; and
generating a ratio for each vertex that represents a distance relationship of the vertex relative to the left lane line and the right lane line;
determining that the intrusion metric satisfies a threshold; and
triggering a collision avoidance response.

2. The method of claim 1, further comprising:
identifying a first ratio associated with a vertex with a largest distance from the left lane line;
identifying a second ratio associated with a vertex with a largest distance from the right lane line; and
selecting a minimum of the first ratio and the second ratio as the intrusion metric.

3. The method of claim 1, wherein generating the bounding box captures the object in the lane at an intersection.

4. The method of claim 3, further comprising extending the right lane line and the left lane line a predetermined distance before and after the intersection.

5. The method of claim 1, further comprising detecting the object within the lane before generating the bounding box.

6. The method of claim 1, wherein computing the intrusion metric comprises computing the intrusion metric that captures available space in the lane.

7. The method of claim 1, wherein the collision avoidance response includes automatic braking.

8. A system, comprising:
at least one processor; and
at least one memory coupled to the at least one processor that includes instructions that, when executed by the at least one processor, cause the system to:

generate a bounding box that captures size and position of an object in a lane comprising a left lane line and right lane line;

compute an intrusion metric that captures an extent to which the object intrudes on the lane based on one or more vertices of the bounding box by:

projecting each vertex of the one or more vertices of the bounding box to the left lane line and the right lane line;

determining distance of each vertex to the left lane line and right lane line; and generating a ratio for each vertex that represents a distance relationship of the vertex relative to the left lane line and the right lane line;

determine that the intrusion metric satisfies a threshold; and trigger a collision avoidance response.

9. The system of claim 8, wherein the instructions further cause the system to:

identify a first ratio associated with a vertex with largest distance from the left lane line;

identify a second ratio associated with a vertex with largest distance from the right lane line; and select a minimum of the first ratio and the second ratio as the intrusion metric.

10. The system of claim 8, wherein the bounding box captures the object in the lane at an intersection.

11. The system of claim 10, wherein the instructions further cause the processor to extend lane lines a predetermined distance before and after the intersection.

12. The system of claim 8, wherein the instructions further cause the processor to detect the object within the lane before generating the bounding box.

13. The system of claim 8, wherein computing the intrusion metric the intrusion metric captures available space in the lane.

14. The system of claim 8, wherein the collision avoidance response includes automatic braking.

15. A method, comprising:

generating a bounding box that captures size and position of an object in a lane comprising a left lane line and right lane line;

projecting each vertex of the bounding polygon to the left lane line and the right lane line;

determining distance of each vertex to the left lane line and the right lane line; and generating a ratio for each vertex that represents a distance relationship of the vertex relative to the left lane line and the right lane line;

identifying a first ratio associated with a vertex with largest distance from the left lane line and a second ratio associated with a vertex with largest distance from the right lane line; and selecting a minimum of the first ratio and the second ratio as an intrusion ratio;

determining that the intrusion ratio satisfies a threshold; and triggering a collision avoidance response.

16. The method of claim 15, wherein generating the bounding box further comprises capturing the object in the lane at an intersection.

17. The method of claim 16, further comprising extending lane lines a predetermined distance before and after the intersection.

18. The method of claim 15, wherein triggering a collision avoidance response comprises at least one of generating a driver alert, automatic braking, or evasive steering.

*     *     *     *     *